No. 781,299. PATENTED JAN. 31, 1905.
F. PORSCHE & L. LOHNER.
SWITCH SYSTEM FOR ELECTRIC VEHICLES.
APPLICATION FILED AUG. 5, 1902.
2 SHEETS—SHEET 1.
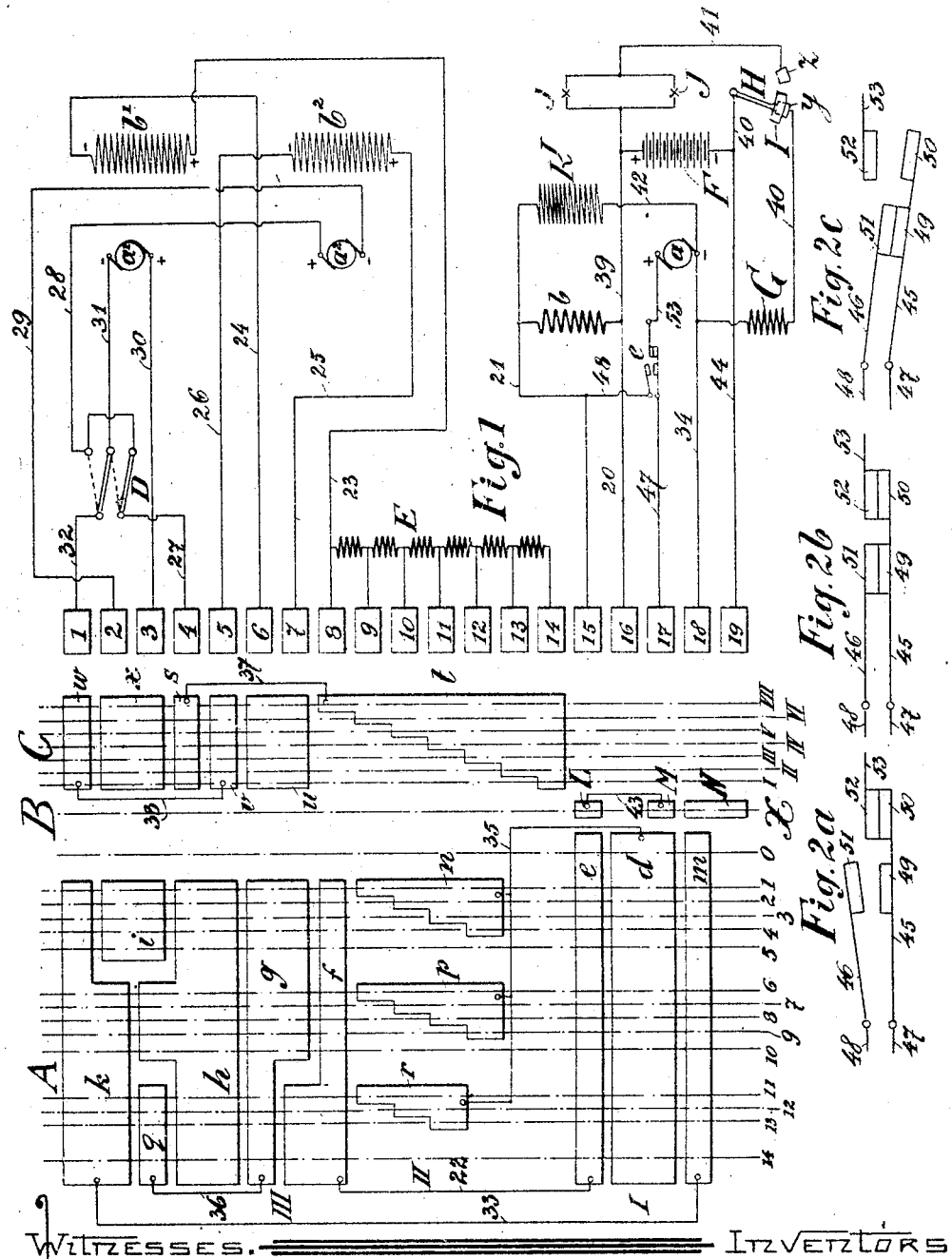

No. 781,299. PATENTED JAN. 31, 1905.
F. PORSCHE & L. LOHNER.
SWITCH SYSTEM FOR ELECTRIC VEHICLES.
APPLICATION FILED AUG. 5, 1902.
Fig.3. Fig.4. Fig.5. Fig.6.
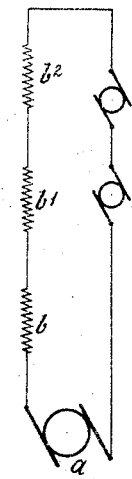
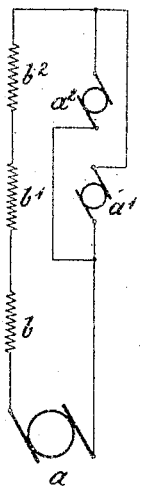
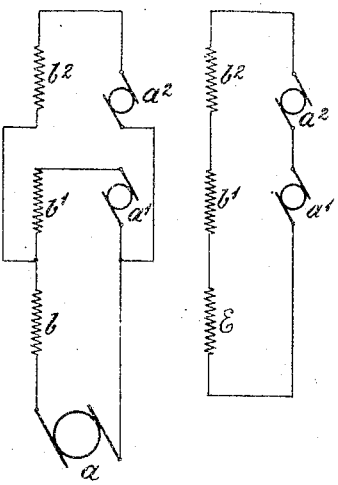
Fig.7.
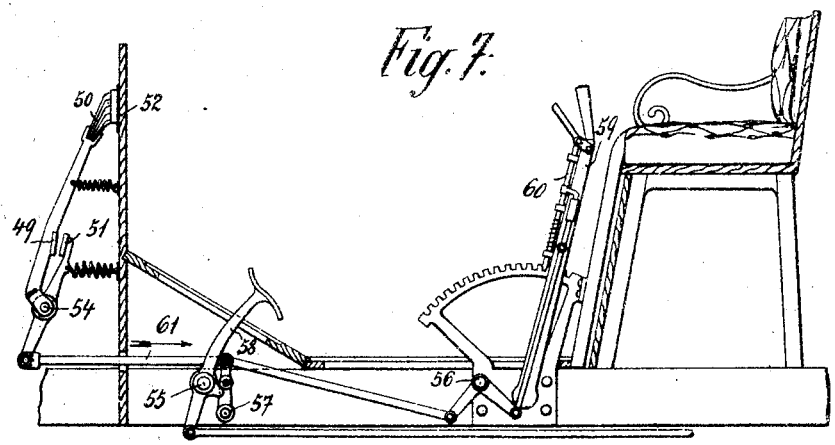
Witnesses. Inventors:
Ferdinand Porsche
Ludwig Lohner, No. 781,299.

Patented January 31, 1905.

UNITED STATES PATENT OFFICE.

FERDINAND PORSCHE AND LUDWIG LOHNER, OF VIENNA, AUSTRIA-HUNGARY.

SWITCH SYSTEM FOR ELECTRIC VEHICLES.

SPECIFICATION forming part of Letters Patent No. 781,299, dated January 31, 1905.

Application filed August 5, 1902. Serial No. 118,486.

*To all whom it may concern:*

Be it known that we, FERDINAND PORSCHE, engineer, of IX Berggasse 6, and LUDWIG LOHNER, manufacturer, of IX Porzellangasse 2, Vienna, Austria-Hungary, subjects of the Emperor of Austria-Hungary, have invented a certain new and useful Improvement in Switch Systems for Electrical Vehicles, of which the following is a specification.

The present invention relates to a switch system for electric vehicles whereby with the aid of a single controlling device variation of the speed is so effected that the controller effects the switching operation of the electromotor as well as of the current-generator. Besides the three phases of the speed produced by conveniently controlling the motors eleven further phases can be obtained by operating the dynamo—viz., by the arrangement of resistances switched parallel to the main field—whereby the power is always fully utilized and is accommodated with a corresponding variation of speed of the vehicle to the power required. Moreover, the dynamo-machine at rest can by operating the same controller be driven from an auxilary battery on the vehicle as an electric motor, so that the dynamo on being directly coupled with the motor—say an explosion-motor—serving as the motive source will start the latter. The auxiliary battery is so switched into the circuit that it can be charged while the vehicle is running and when it is at rest, and, if desired, it may be used to simultaneously effect the lighting of the car. Finally, in the system according to the present invention any spark formation during the change of the speed is prevented by the dynamo being short-circuited or deënergized before the change is effected, which is also the case during the braking action.

In the accompanying drawings, Figure 1 diagrammatically illustrates the arrangement of the circuits, their contact-points, and certain elements—*i. e.*, a generator, motors, a means for varying the resistance, an accumulator, a lighting device, switches and a shunt arranged therein, and a controller, the latter being shown as developed on a flat surface. Figs. $2^a$, $2^b$, and $2^c$ show various positions of the parts of a certain switch $c$. Figs. 3, 4, 5, and 6 are diagrammatic views showing the circuits under the following conditions: the motor-fields in series and the motor-armatures in series, Fig. 3, or the motor-fields in series and the motor-armatures parallel, Fig. 4, the motor-fields parallel and the motor-armatures parallel, Fig. 5, and the motor-fields in series and the motor-armatures in series and the motor elements entirely cut out from the dynamo elements, Fig. 6; and Fig. 7 is a view showing the arrangement of the controller and a brake-lever with reference to a certain switch whereby the dynamo is short-circuited upon moving either the controller or the brake-lever.

The controller-cylinder has three ser a is sliding contacts, of which the first group arranged for, in the case to be described, fourteen different speeds, the second group B serving for, the driving connection and the third group C for braking purposes.

$a$ is the armature of the dynamo.

$b$ represents the corresponding field-windings, while $a'$ $a^2$ and $b'$ and $b^2$ are armature and corresponding fields of the electric motors.

The first group A of the sliding contacts is constituted by three parts or sets, of which the first set I is designed for the connection of the dynamo, the second set II for the resistances, and the third set III for the connection with the electric motors, which according to the connection with the sliding contacts effect the three main phases of the switching operation for the motors.

The switching action for running will now be described with reference to the three main phases of speed.

The parallel broken and dotted lines across the sliding contacts of the controller indicate the various switching positions. In the position 5 the current flows from the positive pole of the armature of the dynamo over the commutator $c$, so as to suppress the formation of sparks during the commutation to the contact 17 and through the slide-contact $d$ to the contact 16, conductor 20 to the field-winding $b$ of the dynamo, conductor 21, contact 15, slide-contact $e$, connection 22, slide-contact $f$, contact 8, conductor 23, field $b'$, conductor 24, contact 6, brush $g$, contact 7, conductor 25, field $b^2$, conductor 26, contact 5, slide-contact $h$, contact 4, conductor 27, over the return-commutator D, conductor 28, armature $a^2$, conductor 29, contact 2, slide-contact $i$, contact 3, conductor 30, armature $a'$, conductor 31, commutator D, conductor 32, contact-piece 1, slide-contact $k$, conductor 33, slide-contact $m$, contact 18, conductor 34 to the negative pole of the armature of the dynamo. As can be seen from this scheme, the fields and the armatures of the electric motors are switched in series, (one behind the other.) In the positions 1 to 4 the switching of the electric motors is the same except that the current in the slide-contact $d$ is divided by resistances being switched parallel to the field of the dynamo. For this purpose the slide-contact $d$ is connected through its conductor 35 with a stepped contact $n$, from which the branch of the circuit flowing through the contacts 9 or 10, 11 or 12, and the resistances E connects with the conductor 23 of the contact 8.

In the position 10 the circuit through the contact parts is as follows: from the positive pole of the dynamo over the switch $c$, contact 17, slide-contact $d$, contact 16, conductor 20, winding $b$, conductor 21, contact 15, slide-contact $e$, conductor 22, slide-contact $f$, contact 8, conductor 23, field-winding $b'$, conductor 24, contact 6, slide-contact $g$, contact 7, conductor 25, winding $b^2$, conductor 26, contact 5, and slide-contact $h$. Here the current is divided, one branch flowing through the contact 4, conductor 27, commutator D, conductor 28, armature $a^2$, conductor 29, contact 2 to the slide-contact $k$, while the other branch passes over the contact 3, conductor 30, armature $a'$, conductor 31, commutator D, conductor 32, and contact 1 again to the slide-contact $k$. From here the currents pass together along the conductor 33 to the slide-contact $m$, contact 18, and conductor 34 to the negative pole of the armature of the dynamo. At the intermediate steps 6 to 9 the current is, as in the previous case, divided at $d$ and flows parallel to the field of the dynamo, with one branch traveling through the conductor 35 to the slide-contact $p$, according to the position through the contacts 9 or 10, 11 or 12, and resistance E to the conductor 23. It will be seen that in this case the field-windings of the electric motors are switched in series, while their armatures are switched parallel to each other.

In the position 14 the following circuit is established by the contacts: from the positive pole of the armature of the dynamo to the switch $c$, contact 17, slide-contact $d$, contact 16, conductor 20, winding $b$, conductor 21, contact 15, slide-contact $e$, connection 22, and slide-contact $f$. The current is here divided and flows, on the one hand, through the contact 8, conductor 23, field $b'$, conductor 24, contact 6, slide-contact $g$, connection 36, slide-contact $q$, contact 3, conductor 30, armature $a'$, conductor 31, commutator D, conductor 32, contact 1 to the slide-contact $k$, and, on the other hand, through 7, conductor 25, field $b^2$, conductor 26, contact 5, slide-contact $h$, contact 4, conductor 27, commutator D, conductor 28, armature $a^2$, conductor 29, contact 2, and again to the slide-contact $k$, from which the currents flow in common through the conductor 33, slide-contact $m$, contact 18, conductor 34 to the negative pole of the armature of the dynamo. In this case armatures and fields of the electric motors are switched parallel to each other, and the resistance E can, through the connection 35 and the slide-contact $r$ in the position 11 to 13, be switched parallel to the field of the dynamo.

In the position $o$ the circuit of the dynamo is broken, as the current passing from $e$ through the conductor 22 to the slide-contact $f$ has through the latter no conductive connection with 8, for which reason the slide-contact $f$ comprises only the positions 1 to 14.

For running backward, the circuits in the armatures of the electric motors are reversed by turning the commutator D into the position shown in dotted lines.

During the application of the brake the dynamo is switched out of action, and the electric motors act as dynamos switched in series, the currents of which are neutralized by the resistance E. This resistance E, which on braking takes up the current of the electric motors, is the same as that which is wholly or partially switched parallel to the field of the dynamo during running. The current therefore flows from the positive armature $a^2$, through 28, commutator D, conductor 27, contact 4, slide-contact $s$, connection 37, slide-contact $t$, according to the position I to VII, through contact 14 or 13, 12, 11, 10, or 9, and resistance E or directly through contact 8 to the conductor 23, field $b'$, conductor 24, contact 6, slide-contact $u$, contact 7, conductor 25, field $b^2$, conductor 26, contact 5, slide-contact $v$, connection 38, slide-contact $w$, contact 1, conductor 32, commutator D, conductor 31, in opposite direction through armature $a'$, conductor 30, contact 3, contact $x$, contact 2, and conductor 29 to the negative pole of the armature $a^2$. This arrangement enables the engine driving the dynamo to be run at a constant speed, while the speed of the carriage is according to necessity conveniently controlled by the switch system.

A battery F of accumulators is connected, on the one hand, through the conductor 39 to the conductor 20, which is connected when contact $d$ bridges contacts 16 and 17 to the positive pole of the armature of the dynamo, and, on the other hand, through a conductor 40 to the conductor 34, which is connected with the negative pole, while in the conductor 40 are inserted a resistance G and a switch H. The battery F is, moreover, connected to the conductor 41, which feeds the lamps J and which forms, on the one hand, a branch of the conductor 39, and, on the other hand, is connected to the switch H and according to the position of which the battery is either only charged or merely serves for lighting purposes or is charged and simultaneously serves for lighting purposes. In order to allow of charging the battery not only during running, but also while the car is stationary the slide-contacts m d e are extended beyond the positions 1 to 14 up to the position O.

The switch H allows three positions. It carries two contacts y z, and the head of the switch-lever is sufficiently broad that in its intermediate position it can rest upon both contacts y and z. In the position of the switch-lever as shown the battery is charged independently of whether the car is in motion or not, and one branch of the current flows from the positive pole of the armature of the dynamo to the commutator c, contact 17, slide-contact d, contact 16, conductors 20 and 39, to the positive pole of the battery, and through the latter and the conductor 40, through the switch H and contact I, y, and resistance G to the negative pole of the armature of the dynamo. The main circuit, however, passes from the conductor 20 through the winding b, and then during running according to the position 1 to 14, as above described, through the electric motors, or when the car is at a standstill through the shunt K and conductor 42 to the negative pole of the armature of the dynamo, so that the latter is always energized. If, however, the head of the lever I makes contact with the contact z, the battery is switched out of the circuit of the dynamo and merely serves for lighting purposes, in which case the current flows from the positive pole of the battery through the conductor 41 and the lamps J, contact z, lever I, and conductor 40 to the negative pole of the battery. Of course when the lever-head I is in contact with both contact-pieces y and z both circuits are closed and accordingly the battery is charged and simultaneously serves for lighting.

Supposing the source of power (say an explosion-engine) for the operation of the dynamo was out of action and is to be set in operation, use is made of the battery F, which in the position X of the controller drives the dynamo as an electric motor, and thereby drives the explosion-motor with which it is directly coupled. In this case the current passes from the positive pole of the battery F, through the conductors 39, field b, conductor 21, contact 15, slide-contact L, conductor 43, slide-contact M, contact 17, switch c, armature a, conductor 34, contact 18, slide-contact N, contact 19, and conductor 44 to the negative pole of the battery.

In order to prevent during the movement of the commutator the formation of sparks from one step to the other or to avoid the necessity of a special blow-out device for this purpose, the dynamo in the present arrangement is deënergized, for which purpose the above-mentioned switch c is used. This switch consists of two rotatable levers 45 46, one of which, 45, is connected through conductor 47 with the contact 17, and the other, 46, through the conductor 48 with the conductor 21. The conductor 45 carries two contacts 49 50, the former of which is capable of being brought in contact with the contact 51 of the lever 46, while the contact 50 is normally in contact with the contact 52, and thereby connects through the conductors 47 and 53 the positive pole of the armature of the dynamo with the contact 17.

The operation of this switch is as follows: When for the purpose of short-circuiting the dynamo the lever 46 is moved in the direction of the arrow, Fig. 2$^a$, the contact 51 is brought in contact with the contact 49, Fig. 2$^b$. The current flows then from the positive pole of the armature of the dynamo through conductor 53, contacts 52 and 50, lever 45, contacts 49 and 51, lever 46, conductors 48, 21, shunt K, and conductor 42 to the negative pole of the armature of the dynamo. Hereby the pressure in the armature of the dynamo falls so low that no current can pass to the electric motors, which maintain their pressure, so that no current passes through the field b, and the contacts 50 and 52 upon the immediate further motion of the lever 46 into the position Fig. 2$^c$ are separated without formation of sparks, after which the switching operation proper is effected. The lever 46, causing the short-circuiting of the dynamo, is now connected, on the one hand, with the crank of the controller and, on the other hand, with the brake-pedal in such a manner that a commutation of the controller can only be effected after an operation of the switch, while the automatic brake-pedal also first operates the switch c before it can come into operation.

54, 55, 56, and 57 denote fixed pivots. 58 is the brake-pedal, 59 the controller-crank, and 60 its locking device. It will be seen that if the brake-pedal is actuated, lever 61 will move in the direction of the arrow in Fig. 7, the said lever actuating thereby the switch 54 in the manner described above. The same result is accomplished if the controller-crank is actuated, which can only be effected when the locking device is released, (moved.) Both levers on pivot 54 are of course insulated from each other.

The hand-crank of the controller is for safety sake provided with a locking device by which the crank is secured in its various positions. The switch c is so arranged that a motion of the levers 45 and 46 and the short-circuiting of the dynamo thereby effected takes place simultaneously with the release of the locking device, whereby the controller can be operated only after this release, after which the dynamo is already deënergized.

The switch is, moreover, so connected with the automatic brake-pedal, as used in electrically-driven vehicles, that upon an operation of this brake in the first place the switch short-circuits the dynamo and deënergizes the latter before the brake can be made operative. Thus for each automatic braking the current to the electric motors is first cut off independently of the position of the controller.

What we claim as our invention, and desire to secure by Letters Patent, is—

1. The combination of a dynamo, a motor, an open electric circuit comprising the dynamo elements and motor, a variable resistance, and a common means for making the circuit and for switching the resistance parallel with the dynamo-field and varying the same during the maintenance of the circuit, substantially as described.

2. The combination of a dynamo, a plurality of motors, a system of wiring comprising the dynamo elements, another system of wiring comprising the motor elements, a variable resistance, and a common means for completing a circuit comprising said systems of wiring and the dynamo and motor elements, for effecting an arrangement in which the motor-fields stand in series and the motor-armatures in series, or the motor-fields in series and the motor-armatures parallel; or the motor-fields parallel and the motor-armatures parallel; and for switching the resistance into said circuit parallel with the dynamo-field and varying the same during the maintenance of the circuit, substantially as described.

3. The combination of a generator of electricity, a plurality of motors, a system of wiring comprising said generator, another system of wiring comprising the motor elements, a variable resistance included in said last-named system, and a controller having contacts, said controller being movable to make of said systems of wiring a single circuit containing the generator, motor and resistance or to make of said last-named system of wiring an independent circuit having the motor-fields in series and the motor-armatures in series and the resistance in series with the motor-fields and to vary said resistance, substantially as described.

4. The combination of a dynamo, a motor, a system of wiring comprising said dynamo, another system of wiring comprising the motor, a shunt having one end attached to one pole of the dynamo-armature, a controller movable to close the circuit comprising said systems of wiring and to establish various relative arrangements of the dynamo and motor elements, a locking device for the controller, and a switch operative from said device and adapted to connect the other end of said shunt with the other pole of the dynamo-armature whereby to short-circuit the latter upon the movement of said device, substantially as described.

5. In an electric vehicle, the combination of a dynamo, a motor, a system of wiring comprising said dynamo, another system of wiring comprising the motor, a shunt having one end attached to one pole of the dynamo-armature, a controller movable to close the circuit comprising said systems of wiring and to establish various relative arrangements of the dynamo and motor elements, a locking device for the controller, a brake-actuating device, and a switch operatively connected to both of said devices and operative from either to connect the other end of said shunt with the other pole of the dynamo-armature to short-circuit the latter upon the movement of either of said devices, substantially as described.

6. The combination of a dynamo, a motor, a circuit including the dynamo and motor, a shunt having one end attached to one pole of the dynamo-armature, a controller movable to close the circuit and to establish various relative arrangements of the dynamo and motor elements, a switch adapted to connect the other end of said shunt with the other pole of the dynamo-armature whereby to short-circuit the latter, and mechanical means, operative from the controller, for moving the switch to effect the short-circuiting prior to the movement of the controller, substantially as described.

7. The combination of a dynamo, a motor, a circuit including the dynamo and motor, a shunt having one end attached to one pole of the dynamo-armature, a brake-actuating device, a controller movable to close the circuit and to establish various relative arrangements of the dynamo and motor elements, a switch adapted to connect the other end of said shunt with the other pole of the dynamo-armature whereby to short-circuit the latter, and mechanical means, operative from the brake-actuating device, for moving the switch to effect the short-circuiting upon the movement of said brake-actuating device, substantially as described.

In testimony whereof we have hereunto set our hands in presence of two subscribing witnesses.

FERDINAND PORSCHE.
LUDWIG LOHNER.

Witnesses:
ALBIN SCHILLER,
ALVESTO S. HOGUE.